(12) United States Patent
Hooper et al.

(10) Patent No.: US 6,668,311 B2
(45) Date of Patent: Dec. 23, 2003

(54) METHOD FOR MEMORY ALLOCATION AND MANAGEMENT USING PUSH/POP APPARATUS

(75) Inventors: Donald F. Hooper, Shrewsbury, MA (US); Gilbert Wolrich, Framingham, MA (US); Matthew J. Adiletta, Worcester, MA (US); William R. Wheeler, Southborough, MA (US)

(73) Assignee: Intel Corporation, Santa Clara, CA (US)

( * ) Notice: Subject to any disclaimer, the term of this patent is extended or adjusted under 35 U.S.C. 154(b) by 227 days.

(21) Appl. No.: 09/919,058

(22) Filed: Jul. 30, 2001

(65) Prior Publication Data

US 2003/0056055 A1 Mar. 20, 2003

(51) Int. Cl.[7] .............................................. G06F 12/00
(52) U.S. Cl. ............................ 711/170; 711/5; 711/217
(58) Field of Search ............................ 711/5, 170, 171, 711/217, 219

(56) References Cited

PUBLICATIONS

Tanenbaum, Andrew S. Structured Computer Organization. Prentice Hall. 1990. pp. 178–187.*

* cited by examiner

*Primary Examiner*—Kevin Verbrugge
(74) *Attorney, Agent, or Firm*—Fish & Richardson P.C.

(57) ABSTRACT

An apparatus and method for memory allocation with digital processing systems comprises a first memory bank, a hardware register, and a processing circuit configured to write the contents of the hardware register to a memory address in the first memory bank, and to write the memory address to the hardware register. In an embodiment, a pointer list containing memory pointer values may be maintained in the first memory bank. The first memory bank may contain associated data buffers, and a second memory bank may contain corresponding data buffers such that an associated data buffer and a corresponding data buffer may be located from a single memory pointer value.

23 Claims, 4 Drawing Sheets

METHOD FOR MEMORY ALLOCATION AND MANAGEMENT USING PUSH/POP APPARATUS

BACKGROUND

1. Field

The present invention relates generally to memory allocation for digital processing systems.

2. Background

Memory allocation refers to reserving memory for specific purposes. Operating systems and application programs generally reserve fixed amounts of memory at startup and allocate more memory when additional functions are executed.

Heap storage is an area of dynamic memory reserved for data that is created at run-time, that is, when a program executes. Conventionally, the operating system maintains heap storage for dynamic memory.

DESCRIPTION OF DRAWINGS

Like reference symbols in the various drawings indicate like elements.

DETAILED DESCRIPTION

An apparatus and method of memory allocation is described herein.

Figure 1:
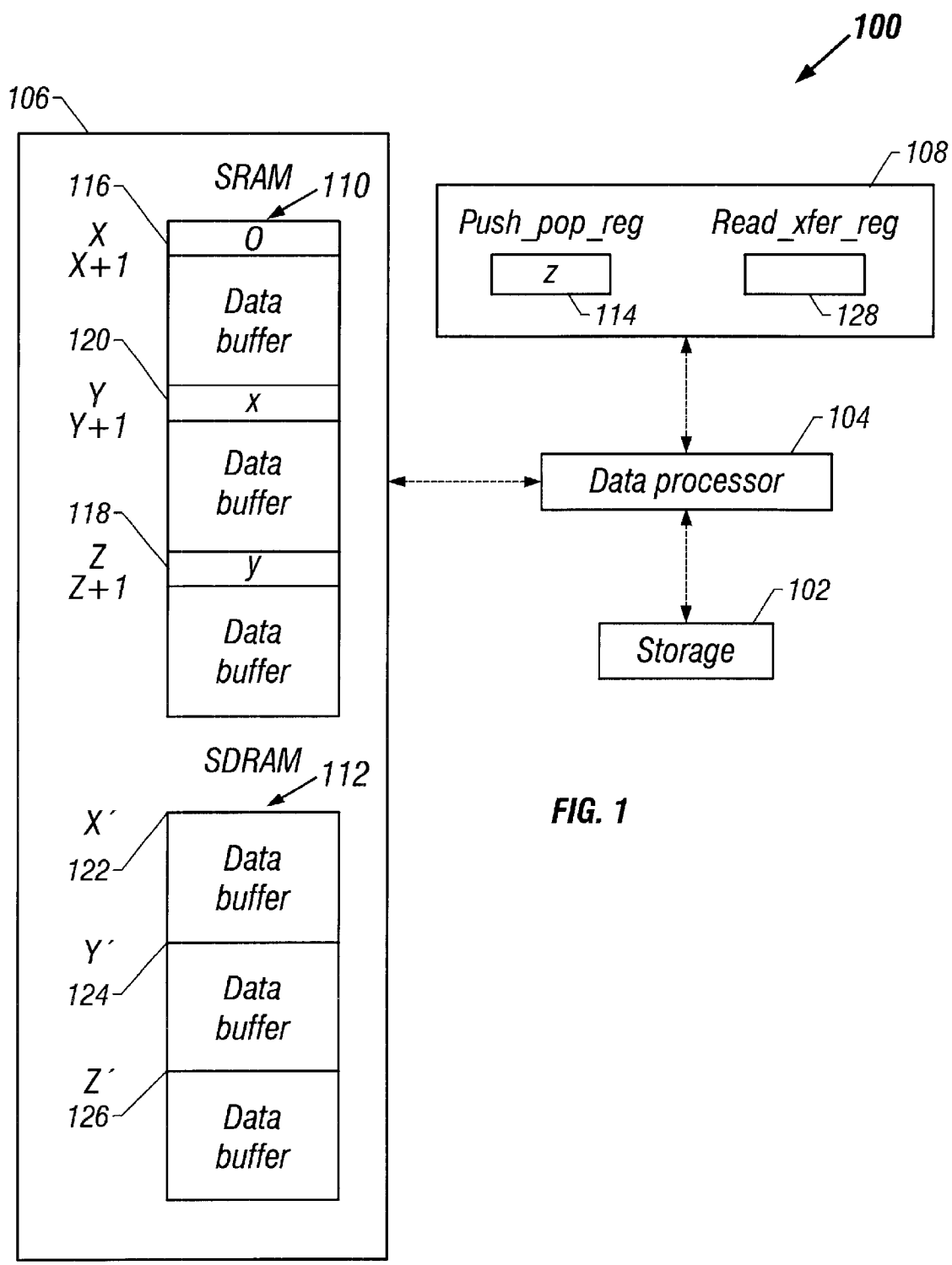
FIG. 1 is a block diagram of a particular memory allocation apparatus.

FIG. 1 is a block diagram of a particular memory allocation apparatus 100. The apparatus comprises storage 102 for storing programs, for example, operating systems and application programs, a processor circuit such as a data processor 104 for executing the instructions of the operating system and application programs, a random-access memory 106 for storing data and addresses to memory locations, and registers 108 for storing addresses of memory locations.

The random-access memory 106 may have two different memory banks. A first memory bank may be static random-access memory (SRAM) 110, and a second memory bank may be synchronous dynamic random-access memory (SDRAM) 112.

A last-in first-out (LIFO) pointer list may be populated in the SRAM 110 by means of a hardware register push_pop_reg 114 used to push and pop contents of the stored pointer list. The stored pointer list may be referred to as a freelist. The head of the freelist may be a pointer stored in the push_pop hardware register 114, and the end of the freelist may be the value 0 stored in memory location X 116.

The contents of the push_pop hardware register 114 may be a stack pointer that points to the next available entry in the freelist. In the particular apparatus shown in FIG. 1, the address value z in the push_pop_reg points to the memory location Z 118. Location Z contains an address value y that points to the next entry Y 120 in the freelist. The address value in location Y is x, which points to the location X 116. The address value in location X is 0, which may indicate the end of the freelist.

A stride length, or stride, may include a pointer location and an associated data buffer. For example, when location X 116 is the base address of the pointer list, location Y 120 equals X+stride and location Z 118 equals X+2*stride. The first word of a stride may contain the pointer, and the remaining words may be the associated data buffer that may be written to or read from.

Additional data buffers may also be in SDRAM 112. The address values x, y, and z of the freelist may be translated to obtain the address values corresponding to locations X' 122, Y' 124, and Z' 126 in SDRAM.

Figure 2:
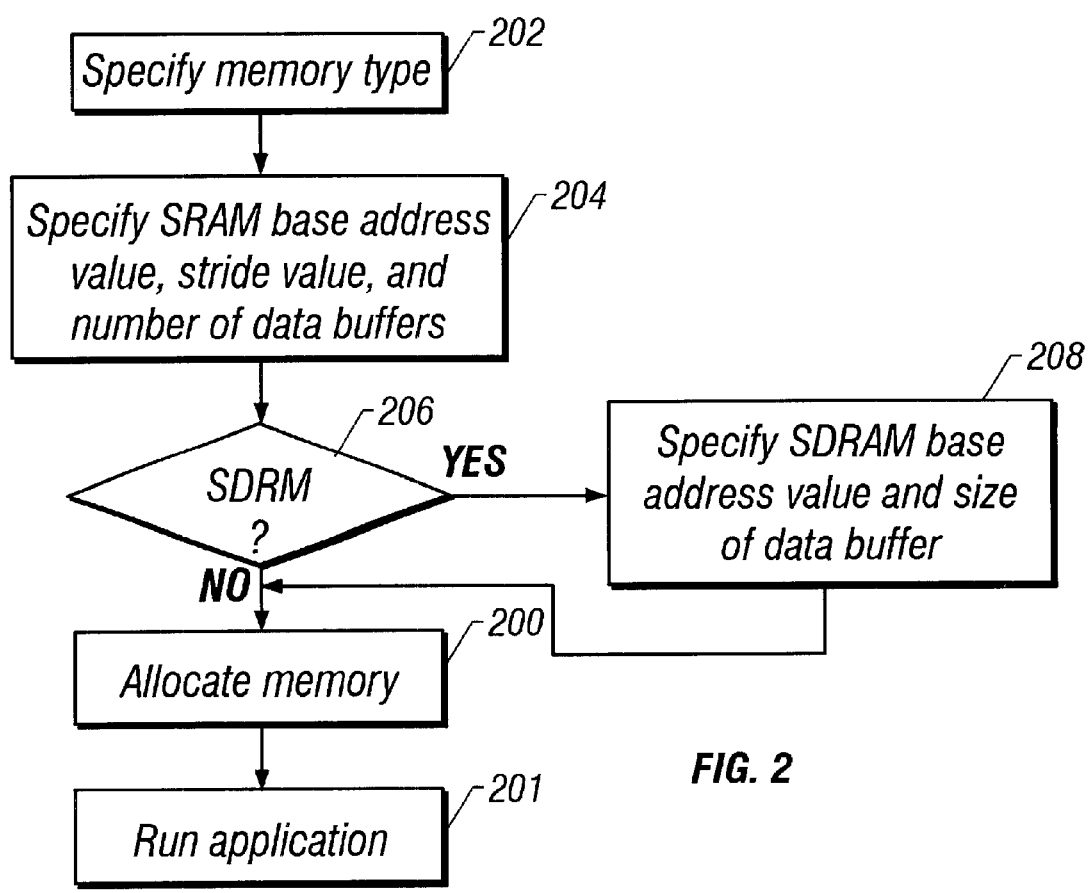
FIG. 2 is a diagram of memory allocation and management.

FIG. 2 is a diagram of memory allocation and management. Memory may be allocated at 200 prior to run-time of the application program at 201.

The source code of the application program may specify the identity of the freelist "free_listid," the memory type of the data buffers, the base address value "base_addr" of the location of the end of the freelist, the value of the stride "stride," and the number of data buffers "num_entries" at 202 and 204. The memory type may be SRAM or SDRAM or both. When SDRAM is specified at 206, two memory banks may be used and source code may specify the SDRAM base address value for the second memory bank "ptr_base" and the size of the corresponding data buffers for the second memory bank in SDRAM "buffer_size" at 208.

A macro create freelist may populate the freelist. The format for the macro may be create_freelist[free_listid, base_addr, stride, num_entries].

Figure 3:
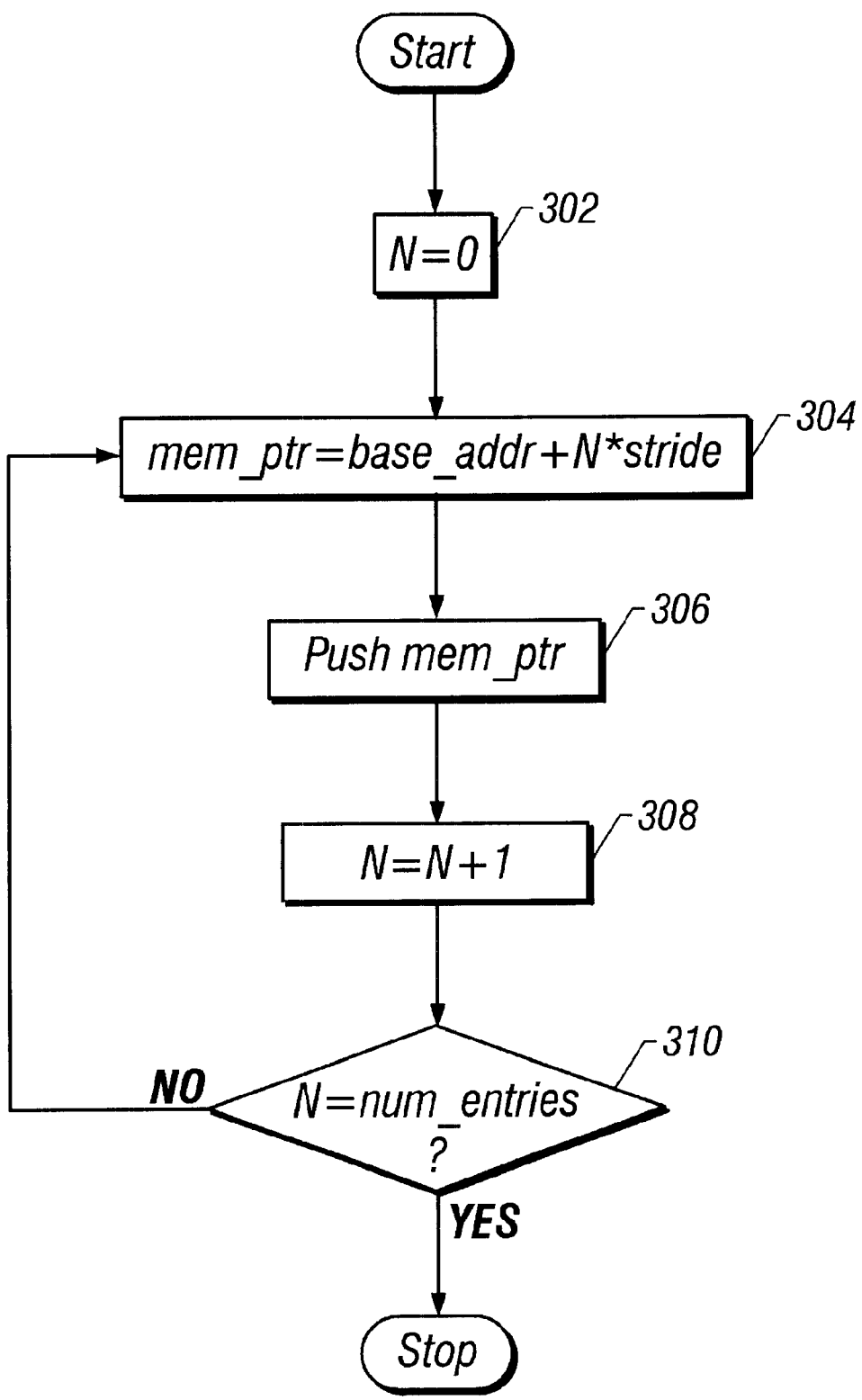
FIG. 3 is a diagram of allocating memory.

FIG. 3 is a diagram of allocating memory. A counter N may be initially set to 0 at 302. A value of a memory pointer variable mem_ptr may be set to the base address value base_addr plus N times the stride at 304. The memory pointer value may be pushed onto the freelist at 306. The counter may be incremented by 1 at 308. N may be tested to determine if it is equal to the number of entries to be allocated to the freelist at 310. When N is equal to the number of entries, the allocation of memory may stop. When N is not equal to the number of entries, 304 through 310 may be repeated until N equals the number of entries.

Figure 4:
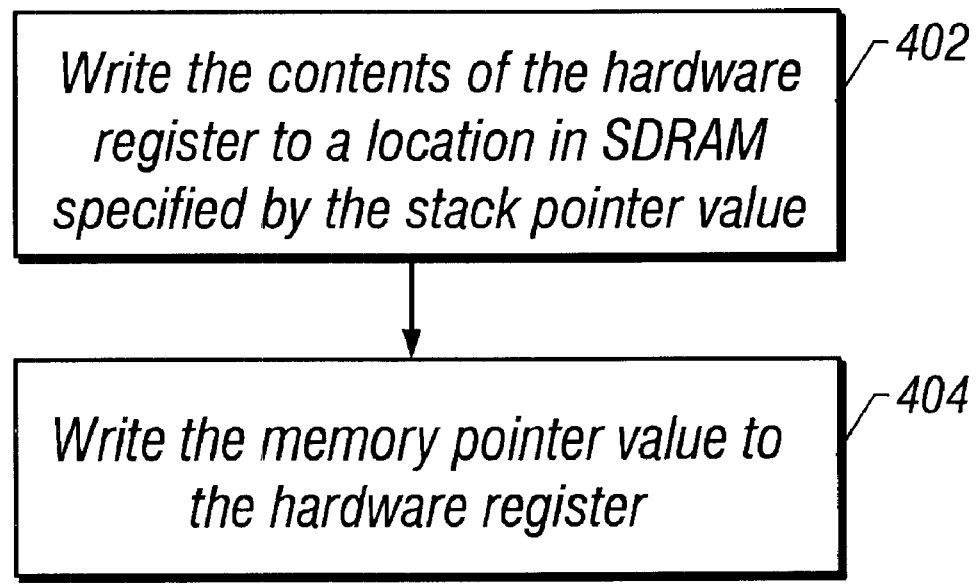
FIG. 4 is a diagram of a push function.

FIG. 4 is a diagram of a push function. The push function may be used add entries to the freelist. The push function may write the contents of the push_pop hardware register 114 to a location in SDRAM specified by the memory pointer value at 402, and may write the memory pointer value to the push_pop hardware register at 404.

To create the particular freelist shown in FIG. 1, the push_pop hardware register 114 may initially contain a termination value for the freelist. The termination value of the freelist may be a fixed predetermined value such as 0. The variable mem_ptr may be set to the base address value x at 304. The memory pointer value x may be pushed onto the freelist by writing the value 0 to location X at 116, and the value x may be written to the push_pop hardware register 114. Similar actions may be taken for pushing y and z onto the freelist.

Figure 5:
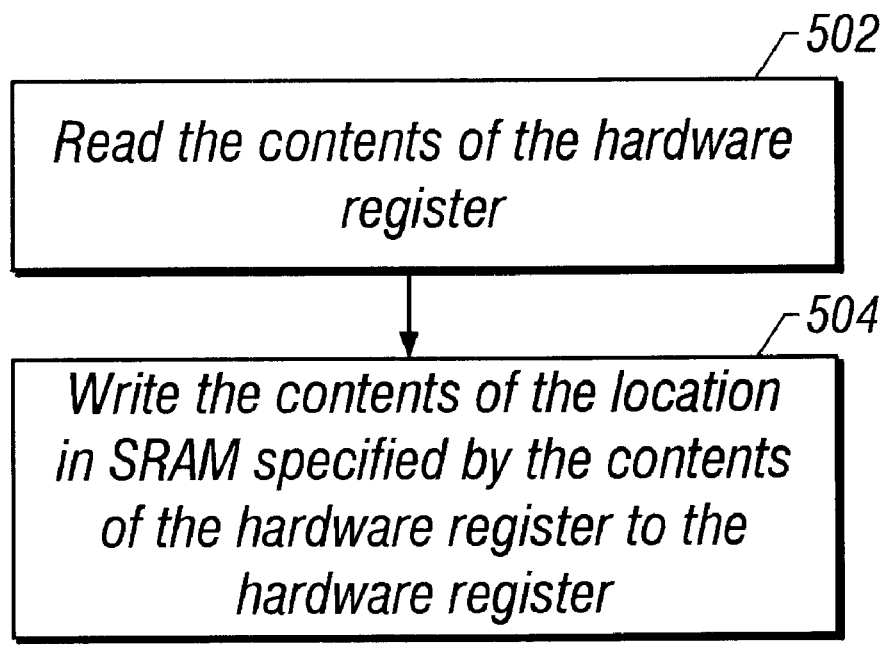
FIG. 5 is a diagram of a pop function.

FIG. 5 is a diagram of a pop function. The pop function may be used to retrieve the pointer corresponding to the next available freelist entry. The pop function may read the contents of the push_pop hardware register 114. The contents of the push_pop hardware register specifies a location in SRAM. The contents of the location in SRAM may be written to the push_pop hardware register at 504.

For example, the pop function may read the value z in the push_pop hardware register, and may write the value y found in the location Z to the push_pop hardware register.

A macro malloc may retrieve the memory address value of the next available associated data buffer for the freelist.

Recall that the pointer corresponding to the next available freelist entry is obtained from the push_pop hardware register 114 by the pop function. The memory address value of the next available associated data buffer may be calculated by adding a pointer offset value to the address of the next available freelist entry, as indicated at 116, 118 and 120 of FIG. 1. The pointer offset value may be the size of a pointer value in memory, for example. A data transfer register labelled read_xfer_reg at 128 of FIG. 1 may be specified as an available transfer register that can store the returned value. The format for the macro may be malloc [mem_ptr, freelist_id, read_xfer_reg]. For SRAM, the malloc return value mem_ptr is the popped pointer. The data buffer associated with the popped pointer may then be written and read according to the memory address value stored in the data transfer hardware register until a free function is issued for the popped pointer.

When the second memory bank SDRAM 112 is to be used, as specified at 206 in FIG. 2, the memory address of an additional corresponding data buffer as shown at 122, 124 and 126 of FIG. 1 may be found. The memory address of the additional corresponding memory buffer may be found by translating the popped pointer value using the second memory bank base address value in SDRAM "ptr_base" and size of the additional data buffer "buffer size".

The translation of the popped pointer may be calculated by subtracting the SRAM base address value "base_addr" from the popped pointer to obtain a difference which is a first offset of the memory buffer within the first memory bank SRAM. The first offset may be divided by the stride to obtain an index of the associated data buffer within the first memory bank SRAM. The index may be multiplied by the size of the corresponding data buffer in SDRAM "buffer_size" to obtain a second offset of the corresponding data buffer within the second memory bank SDRAM. The second memory bank base address value "ptr_base" may be added to the second offset to obtain the memory address of the corresponding data buffer which is the translation of the popped pointer.

It will be apparent to one skilled in the art that for the set of three values which is the memory address of the associated data buffer in SRAM, the memory address of the corresponding data buffer in the second memory bank SDRAM, and the index, that any one of the three values can be used to calculate the other two values.

It will be further apparent to one skilled in the art that the stride and the additional data buffer size "buffer_size" may be chosen such that the second offset may be calculated by shifting the first offset left by a fixed value "ptr_shift". This choice may be accomplished by specifying a "buffer_size" at 208 in FIG. 2 that is a power of two times the stride. Thus, the multiplication and division calculations for the translation of the popped pointer can be efficiently performed by a shift operation.

A free function may push a pointer back onto the freelist. The format for free may be free[mem_ptr, freelist_id]. For example, if z and y have been popped then x is the contents of push_pop_reg 114. To free Z, z is pushed onto the freelist by writing x to location Z and writing z to push_pop_reg.

In one embodiment, an example of the use of the present invention is provided in which the freelist is used to maintain, store, and forward communication packets. In this example, packet descriptor information may be stored in the SRAM associated data buffer, and packet content information may be stored in the SDRAM corresponding data buffer.

The following code may create a freelist handle that defines the values necessary to maintain the freelist.

```
#define FREELIST_ID 0
#define FREELIST_HANDLE FREELIST_ID,
    SDRAM_PKT_BUFFER_BASE, PKBUF_SIZE,
    SRAM_BUFF_DESCRIPTOR_BASE, DESC_SIZE
```

In this example, SRAM BUFF DESCRIPTOR BASE provides the base address value "base_addr", DESC_SIZE plus one provides the stride value, SDRAM_PKT_BUFFER_BASE provides the SDRAM base address value "ptr_base", and PKBUF_SIZE provides the size of the alternative buffer in SDRAM "buffer_size". Using the freelist handle, the freelist may be created as previously described with respect to FIG. 2.

In this example, the index of the data buffer is associated with the particular communications packet. The following code may associate the index with the communications packet.

```
.if (next_buf_index == UNALLOCATED)
    buf_pop($pop_xfer[0], FREELIST_HANDLE,
            sig_done);
.endif
.if (next_buf_index == UNALLOCATED)
    buf_wait();
    #define BASE_ADDR SRAM_BUFF_DESCRIPTOR_BASE
    .while ($pop_xfer[0] == BASE_ADDR)
        buf_pop($pop_xfer[0], FREELIST_HANDLE,
                ctx_swap);
    .endw
    buf_index_from_sram_addr(next_buf_index,
                            $pop_xfer[0],
                            FREELIST_HANDLE);
.endif
```

A variable "next_buf_index" may contain the index associated with the communications packet. If no memory buffer is currently allocated for the communications packet, a function "buf_pop" may be used as the pop function to place the address of the next available associated data buffer in the variable "$pop_xfer[0]" as the available transfer register. If there is no available memory buffer to pop from the freelist, the popped pointer value will be equal to the base address value of the first memory bank SRAM. The function "buf_pop" may be repeatedly invoked until a memory buffer becomes available.

In this embodiment, the index may be calculated by a routine named "buf_index_from_sram_addr" and placed in the variable "next_buf_index", using the value of the associated data buffer address held in the variable "$pop_xfer[0]".

Once the index is known, the memory address of the associated data buffer in SRAM may be calculated from the index as a variable "descriptor_addr", which in this example is used to store packet descriptor information. The memory address of the corresponding data buffer in the second memory bank SDRAM may be calculated from the index as a variable "packet_buf_addr", which in this example is used to store packet content information. These calculations may be performed by routines as follows.

```
buf_sram_addr_from_index(descriptor_addr,
                         next_buf_index,
                         FREELIST_HANDLE)
buf_dram_addr_from_index(packet_buf_addr,
                         next_buf_index,
                         FREELIST_HANDLE);
```

The packet may be stored, and then transmitted when the buffer is placed back on the freelist using a macro buf_push.

Alternatively, the present invention may be used with multiple threads of execution, wherein each thread may have its own freelist. Each buffer freelist may have its own freelist identifier "free list_id" and its own base address value within the first memory bank SRAM "base_addr", and its own base address value within the second memory bank SDRAM "ptr_base". Multiple freelists may allow use of alternate sets of memory to obtain a performance improvement by hiding memory precharge cycles, for example. If the present invention is used in an application to receive, store and transmit communication packets, for example, the freelist identifier may be included as part of the packet descriptor, so the thread that transmits the packet can determine which freelist to push the buffer back into by extracting the freelist_id from the packet information.

A number of embodiments of the invention have been described. Nevertheless, it may be understood that various modifications may be made without departing from the spirit and scope of the invention. Accordingly, other embodiments are within the scope of the following claims.

What is claimed is:

1. A method of memory allocation comprising:
   (a) using a pop operation to obtain a memory pointer value;
   (b) using the memory pointer value to obtain both a first pointer to a first memory bank at a location specified by the memory pointer value
   and a second pointer to a second memory bank different than the first memory bank.

2. The method of claim 1 further comprising:
   reading the contents of a hardware register; and
   writing the contents from the first memory bank at a location specified by the contents of the hardware register to the hardware register.

3. A method of memory allocation comprising:
   (a) determining a memory pointer value;
   (b) writing the contents of a hardware register to a first memory bank at a location specified by the memory pointer value; and
   (c) writing the memory pointer value to the hardware register
   d) specifying a base address value for the first memory bank; and
   e) specifying a stride value for writing the contents of the hardware register to a location in the first memory bank;
   f) wherein determining a memory pointer value comprises summing the base address value and an integer multiple of the stride value.

4. A method of memory allocation comprising:
   (a) determining a memory pointer value;
   (b) writing the contents of a hardware register to a first memory bank at a location specified by the memory pointer value;
   c) writing the memory pointer value to the hardware resister;
   d) specifying a number of data buffers to allocate; and
   e) repeating (a) through (c) according to the number of data buffers to allocate.

5. A method of memory allocation comprising:
   (a) determining a memory pointer value;
   (b) writing the contents of a hardware register to a first memory bank at a location specified by the memory pointer value; and
   (c) writing the memory pointer value to the hardware register;
   (d) reading the contents of the hardware register; and
   (e) writing the contents from the first memory bank at a location specified by the contents of the hardware register to the hardware register;
   (f) specifying a base address value for the first memory bank;
   (g) specifying a stride value indicating the combined size of a pointer and an associated data buffer in the first memory bank;
   (h) specifying a base address value for the second memory bank, and
   (i) specifying a wise of a corresponding data buffer in the second memory bank.

6. The method of claim 5 further comprising:
   determining a memory address of the associated data buffer in the first memory; and
   determining a memory address of the corresponding data buffer in the second memory bank corresponding with the contents of the hardware register.

7. The method of claim 6 wherein determining the memory address of the associated data buffer comprises adding a pointer offset value to the contents of the hardware register.

8. The method of claim 6 wherein determining the memory address of the corresponding data buffer comprises:
   obtaining an index value by dividing the difference between the contents of the hardware register and the base address value for the first memory bank by the stride value; and
   summing the base address value for the second memory bank with the product of the index and the size of the corresponding data buffer.

9. The method of claim 5 wherein the first memory bank is static random access memory and the second memory bank is synchronous dynamic random access memory.

10. A method of memory allocation, comprising;
    determining a memory pointer value;
    locating an associated data buffer in a first memory bank according to the memory pointer value, and
    locating a corresponding data buffer in a second memory bank according to the memory pointer value.

11. The method of claim 10, further comprising:
    specifying a base address value for the first memory bank;
    specifying a stride value indicating the combined size of the associated memory buffer with the size of a pointer value;
    specifying a base address value for the second memory bank; and
    specifying a size of the corresponding data buffer in the second memory bank.

12. The method of claim 11, wherein locating the associated data buffer comprises adding a pointer offset value to the memory pointer value; and wherein locating the corresponding data buffer comprises:
obtaining an index value by dividing the difference between the memory pointer value and the base address value for the first memory bank by the stride value; and
summing the bane address value for the second memory bank with the product of the index and the size of the corresponding data buffer.

13. The method of claim 10, wherein determining the memory pointer value comprises popping a next available memory pointer value from a pointer list maintained in the first memory bank, by setting the memory pointer value to the address of a next available entry in the pointer list.

14. The method of claim 13, further comprising pushing a free entry onto the pointer hut, wherein pushing comprises:
writing the address of the next available entry in the pointer list to the location of the free entry; and
setting the next available entry in the pointer list to the address of the free entry.

15. A method as in claim 1, wherein said first memory bank stores descriptor information indicative of the data, and said second bank stores content information.

16. A method as in claim 15, further comprising associating specified content with the index.

17. An apparatus for memory allocation, comprising
a first memory bank;
a hardware registers;
a processing circuit configured to write the contents of the hardware register to a memory address in the first memory bank, and further configured to write the memory address to the hardware register, wherein the processing circuit is further configured to populate a pointer list in the first memory bank by computing memory locations in the first memory bank at intervals of a specified stride value.

18. An apparatus for memory allocation, comprising
a first memory bank;
a hardware register;
a processing circuit configured to write the contents of the hardware register to a memory address in the first memory bank, and further configured to write the memory address to the hardware register;
wherein the processing circuit is further configured to read the contents of the hardware register and write the contents from the first memory bank at a location specified by the contents of the hardware re tutor to the hardware register;

further comprising a second memory bank that holds corresponding data buffers corresponding to the contents of the hardware register.

19. The apparatus of claim 18, wherein the processor circuit is further configured to locate an associated data buffer in the first memory bank by adding a pointer offset value to the contents of the hardware register; and wherein the processor circuit is further configured to locate a corresponding data buffer in the second memory bank by dividing the difference between the contents of the hardware register and a bass address value for the first memory bank by a stride value, which is the combined size of the associated data buffer and a memory pointer, to produce an index value, and summing a base address value for the second memory bank with the product of the index value and the size of the corresponding data buffer.

20. An apparatus for memory allocation, comprising:
a first memory bank;
a second memory bank; and
a processor circuit configured to locate an associated data buffer in the first memory bank and to locate a corresponding data buffer in the second memory bank according to a specific memory pointer value.

21. The apparatus of claim 20, wherein the processor circuit is further configured to add a pointer offset value to the specific memory pointer value to obtain the location of the associated data buffer in the first memory bank; and wherein the processor circuit is further configured to divide the difference between the contents of the specific memory pointer value and a base address value for the first memory bank by a stride value, which is the combined size of the associated data buffer and a memory pointer, to produce an index value, and to sum a base address value for the second memory bank with the product of the index value and the size of the corresponding data buffer to obtain the location of the corresponding data buffer in the second memory bank.

22. The apparatus of claim 20, wherein the processor circuit is further configured to pop a next available memory pointer value from a pointer list maintained in the first memory bank, by obtaining a memory pointer value from the address of a next available entry in the pointer list.

23. The apparatus of claim 22, wherein the processor circuit is further configured to push the specific memory pointer value onto the pointer list by writing the address of the next available memory pointer value in the pointer list to the location in the first memory bank specified by the specific memory pointer value, and setting the next available entry in the pointer list to the specific memory pointer value.

* * * * *